US011625337B2

(12) United States Patent
Durham

(10) Patent No.: US 11,625,337 B2
(45) Date of Patent: Apr. 11, 2023

(54) ENCODED POINTER BASED DATA ENCRYPTION

(71) Applicant: Intel Corporation, Santa Clara, CA (US)

(72) Inventor: David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/134,355

(22) Filed: Dec. 26, 2020

(65) Prior Publication Data

US 2021/0117342 A1  Apr. 22, 2021

(51) Int. Cl.
G06F 12/14 (2006.01)
G06F 21/79 (2013.01)
G06F 9/34 (2018.01)
G06F 21/60 (2013.01)

(52) U.S. Cl.
CPC ...... *G06F 12/1408* (2013.01); *G06F 12/1441* (2013.01); *G06F 21/79* (2013.01); *G06F 2221/0751* (2013.01)

(58) Field of Classification Search
CPC ............ G06F 12/1048; G06F 12/1441; G06F 9/30101; G06F 21/79; G06F 2221/0751; G06F 21/6209
USPC ........................................................ 711/163
See application file for complete search history.

(56) References Cited

U.S. PATENT DOCUMENTS

| 2011/0099429 | A1  | 4/2011  | Varma et al. |
| 2016/0092702 | A1* | 3/2016  | Durham .................... G06F 9/35 713/190 |
| 2016/0364707 | A1  | 12/2016 | Varma |
| 2019/0042799 | A1* | 2/2019  | Durham .................. H04L 9/002 |
| 2019/0095350 | A1  | 3/2019  | Durham et al. |
| 2019/0102567 | A1  | 4/2019  | LeMay et al. |
| 2019/0102577 | A1  | 4/2019  | Gueron et al. |
| 2019/0108130 | A1  | 4/2019  | Durham et al. |
| 2019/0227827 | A1* | 7/2019  | Zmudzinski ........ G06F 12/1009 |
| 2020/0125501 | A1  | 4/2020  | Durham et al. |
| 2020/0125502 | A1  | 4/2020  | Durham et al. |
| 2020/0125742 | A1  | 4/2020  | Kounavis et al. |
| 2020/0125769 | A1  | 4/2020  | Kounavis et al. |
| 2020/0125770 | A1  | 4/2020  | LeMay et al. |

(Continued)

OTHER PUBLICATIONS

EPO; Extended European Search Report issued in EP Patent Application No. 20163661.0, dated Aug. 17, 2020; 9 pages.

(Continued)

*Primary Examiner* — Edward J Dudek, Jr.
*Assistant Examiner* — Sidney Li
(74) *Attorney, Agent, or Firm* — Alliance IP, LLC

(57) ABSTRACT

Technologies disclosed herein provide cryptographic computing. An example method comprises storing, in a register, an encoded pointer to a memory location, wherein the encoded pointer comprises first context information and a slice of a memory address of the memory location, wherein the first context information includes an identification of a data key; decoding the encoded pointer to obtain the memory address of the memory location; using the memory address obtained by decoding the encoded pointer to access encrypted data at the memory location; and decrypting the encrypted data based on the data key.

20 Claims, 13 Drawing Sheets

(56) References Cited

U.S. PATENT DOCUMENTS

| | | |
|---|---|---|
| 2020/0134234 A1 | 4/2020 | LeMay et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0379902 A1 | 12/2020 | Durham et al. |

OTHER PUBLICATIONS

EPO; Extended European Search Report issued in EP Patent Application No. 20163670.1, dated Sep. 29, 2020 3 pages.
EPO; Extended European Search Report issued in EP Patent Application No. 20168972.6, dated Jul. 3, 2020; 9 pages.
USPTO; U.S. Appl. No. 16/722,342, filed Dec. 20, 2019; 121 pages.
USPTO; U.S. Appl. No. 16/722,707, filed Dec. 20, 2019; 172 pages.
USPTO; U.S. Appl. No. 16/740,359, filed Jan. 10, 2020; 171 pages.
EPO Extended European Search Report in EP Application Serial No. 21197337.5 dated Feb. 18, 2022 (11 pages).
Kroes, Taddeus et al., "Delta Pointers Buffer Overflow Checks Without the Checks," EuroSys '18: Thirteenth EuroSys Conference 2018, Apr. 23-26, 2018, Porto Portugal, ACM, New York, NY, USA (14 pages).

\* cited by examiner

ENCODED POINTER BASED DATA ENCRYPTION

TECHNICAL FIELD

This disclosure relates in general to the field of computer systems, more particularly, to encoded pointer based data encryption.

BACKGROUND

Protecting memory in computer systems from software bugs and security vulnerabilities is a significant concern. A buffer overflow, which can affect memory safety, occurs when a program writes data to a buffer and overruns a boundary of the buffer such that adjacent memory locations are overwritten. Similarly, reading past the end of a buffer into another page may trigger an access violation or fault. Another memory safety violation is referred to as a dangling pointer. A dangling pointer is a reference that is not resolved to a valid destination. This may occur when memory is deallocated without modifying the value of an existing pointer to the deallocated (or freed) memory. If the system reallocates the freed memory and the dangling pointer is used to access the reallocated memory, unpredictable behavior, including system failure, may occur. Current computing techniques have used architecture and metadata to provide data protection. For example, in previous solutions, a processor would use lookup tables to encode policy or data about the data for ownership, memory size, location, type, version, etc. However, this metadata requires additional storage (memory overhead) and negatively impacts performance, particularly for implementations with fine-grain metadata. Thus, different approaches are needed to provide memory safety to computing systems.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION

Figure 1:
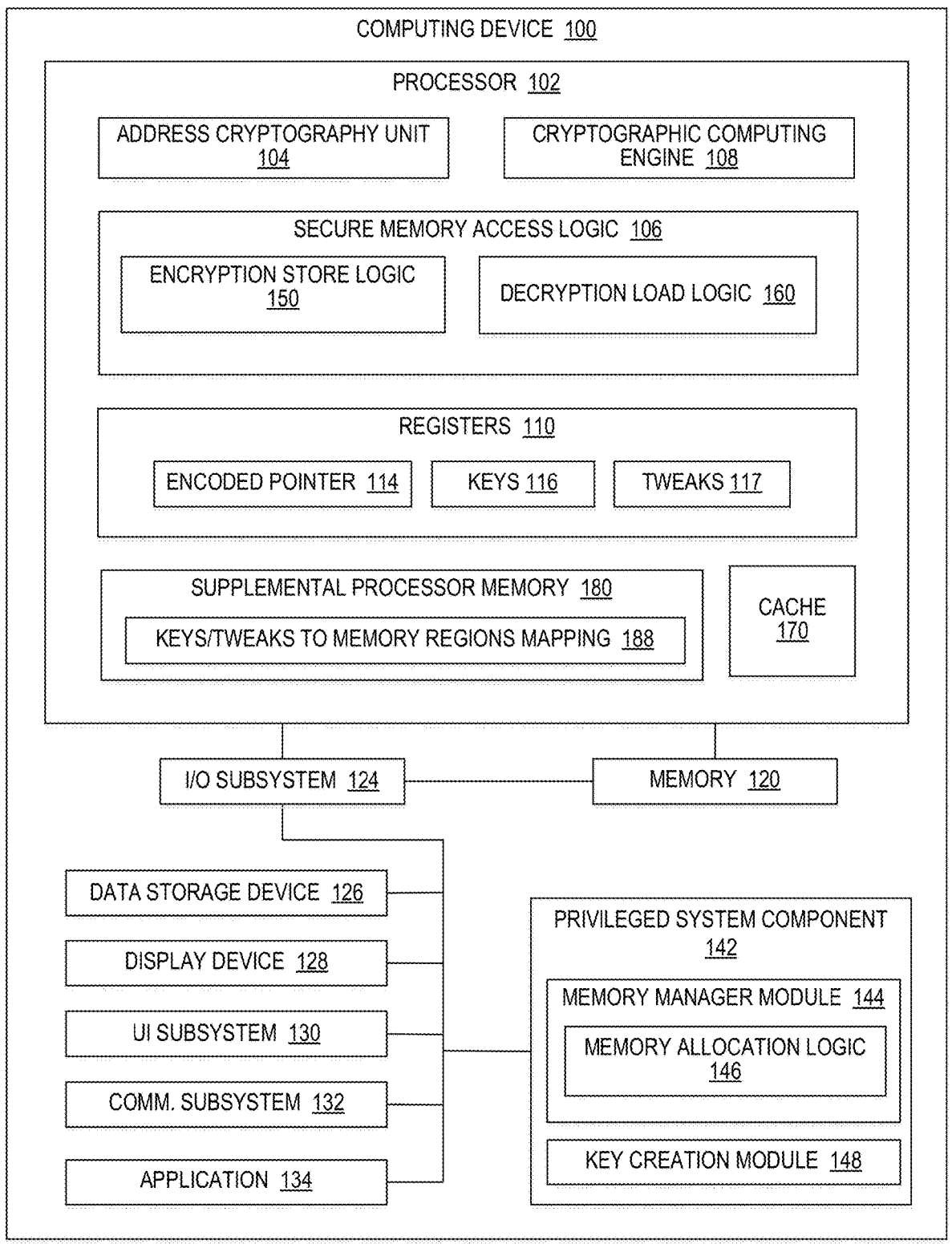
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors, accelerators, field programmable gate arrays, data processing units, etc.) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACS) or implicitly based on an entropy measure of the decrypted data, or both. In one example, MAC codes may be stored per cacheline and evaluated each time the cacheline is read to determine whether the data has been corrupted. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

Turning to FIG. 1, FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g., the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g., virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 $\mu m^2$ of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
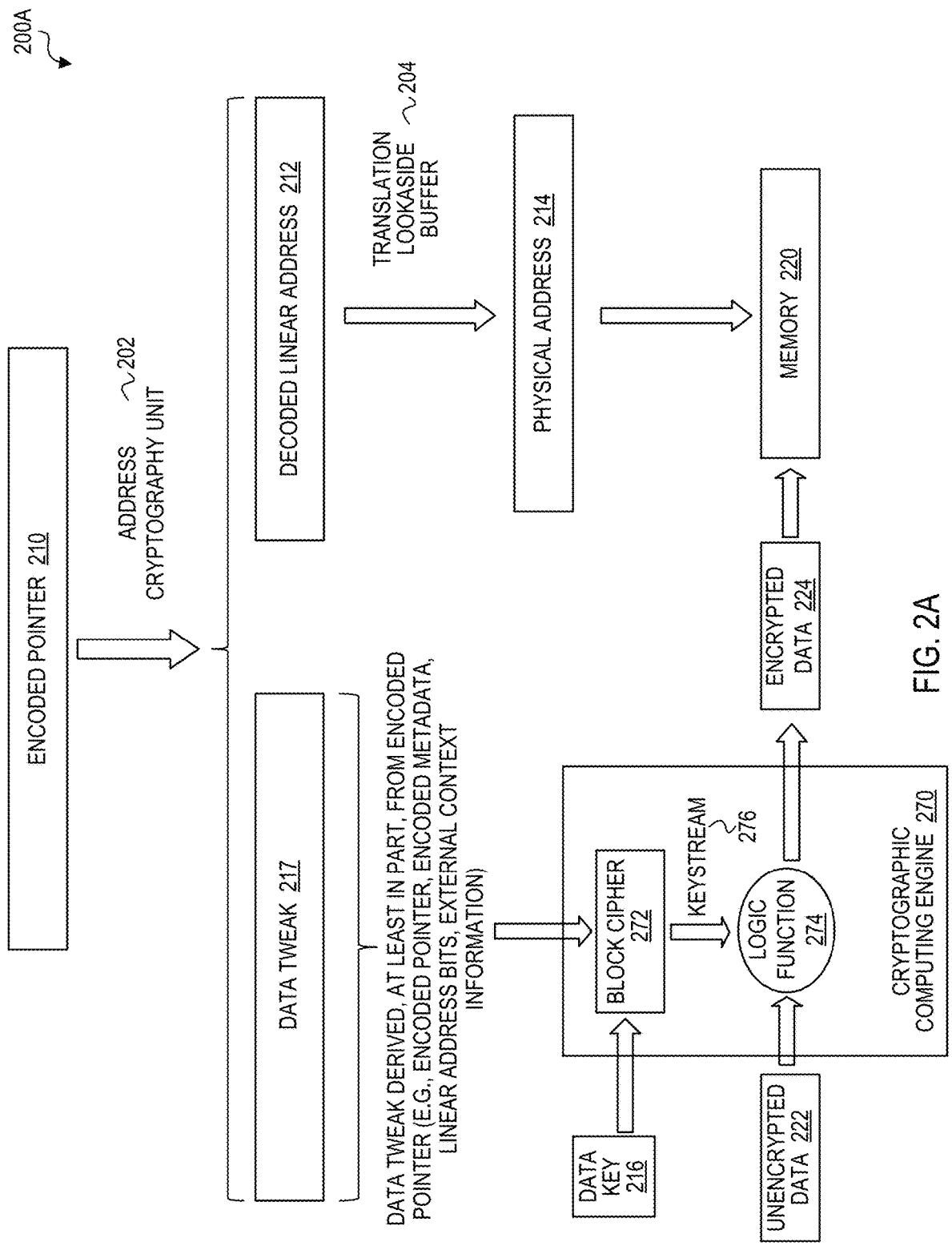
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
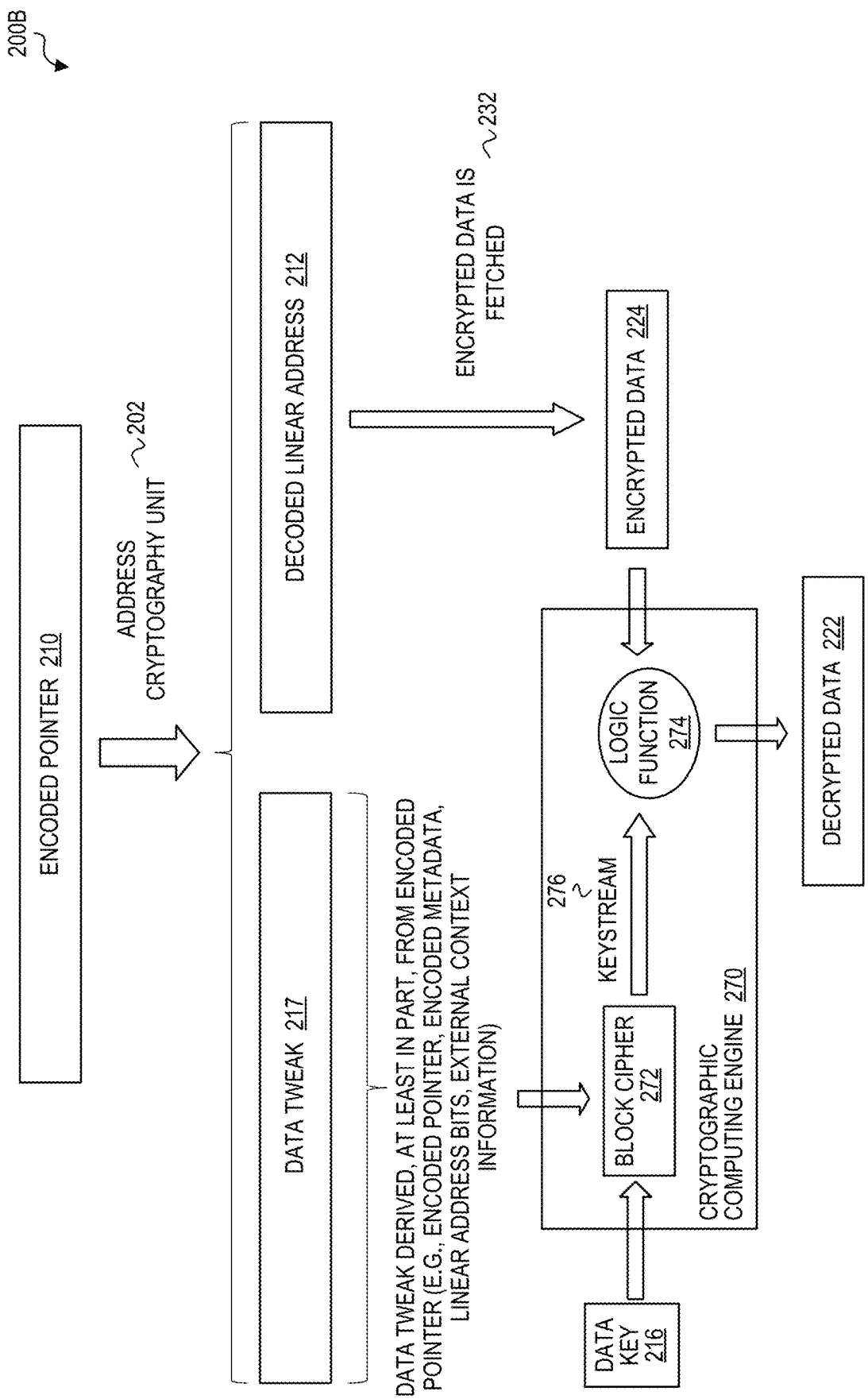
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

Figure 3:
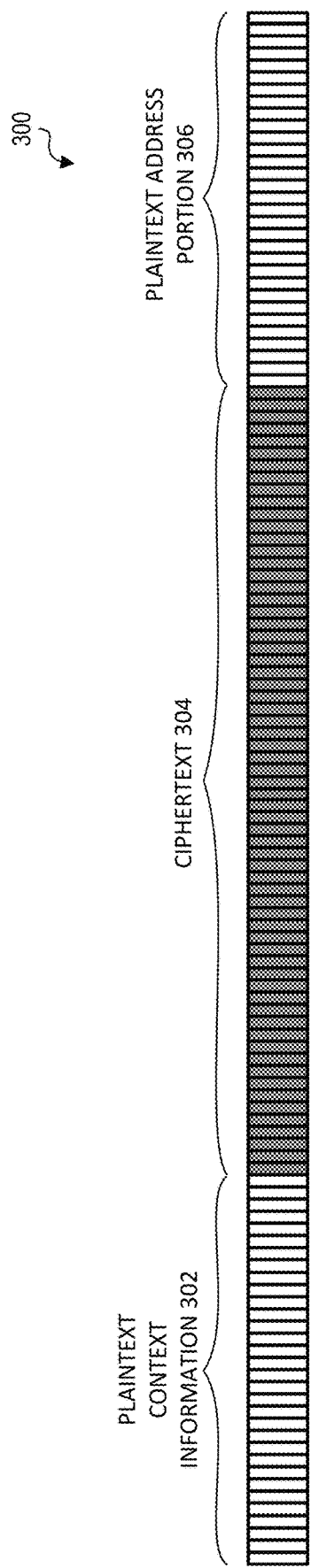
FIG. 3 illustrates a cryptographically encoded pointer according to at least one embodiment of the present disclosure.

FIG. 3 illustrates a cryptographically encoded pointer 300 according to at least one embodiment of the present disclosure. Pointer 300 includes plaintext context information 302, ciphertext 304, and plaintext address portion 306.

As used herein, "context information" is intended to include any metadata or other information related to a memory allocation, its associated memory address, its associated pointer, the software for which the memory was allocated, software utilizing data of the allocation, and/or the contents of the allocated memory. Various examples of context information are described below.

Software is increasingly being compartmentalized, with object-granular control over which data is shared between compartments becoming desirable. Various embodiments of the present disclosure may implement such controls with just a single copy of metadata per object, including support for cryptographic protections, thus reducing memory and performance overheads compared to alternative approaches, while efficiently enforcing memory safety.

In particular embodiments, cryptographically encoded pointers having a bit length of 128 bits are disclosed (although the bit size is not limited thereto). Addresses with such length have ample room for context information, thus improving the cryptographic strength of data when such context information is used as a tweak. Furthermore, the block size of the encrypted slice within the pointer may be increased, further improving the security of the data.

Ciphertext 304 may include an encrypted block of data corresponding to plaintext that may include one or both of additional context information and a portion of the address. Another portion of the address may be included in plaintext address portion 306.

Figure 4:
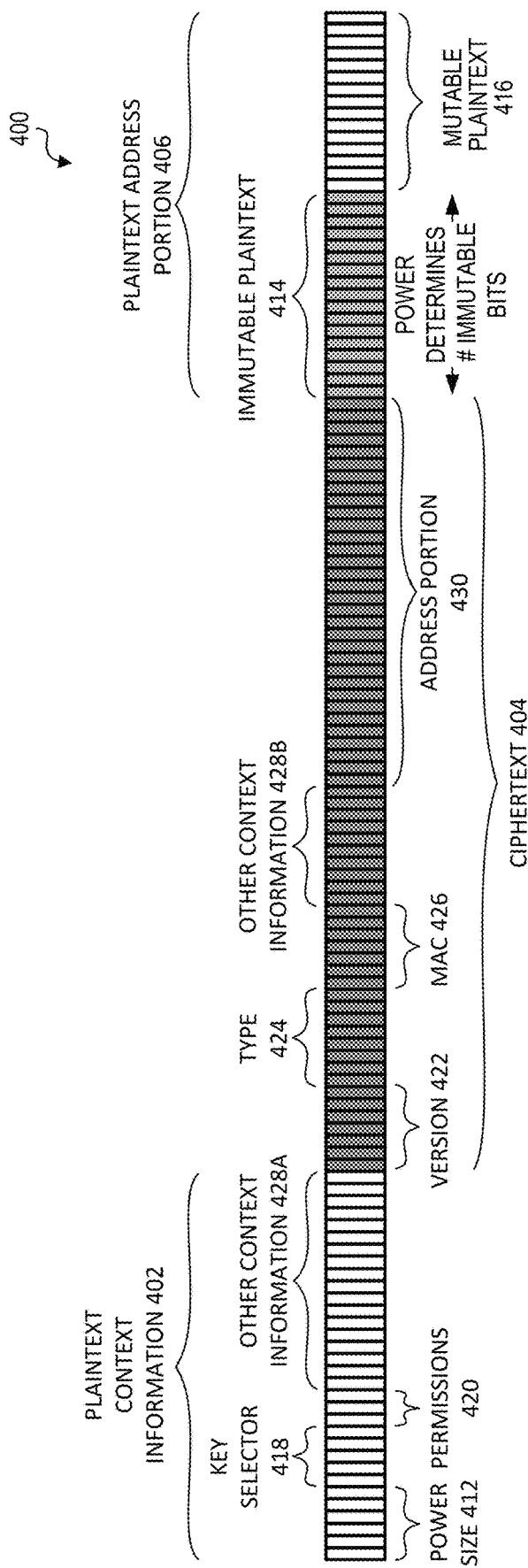
FIG. 4 illustrates a cryptographically encoded pointer with various context information according to at least one embodiment of the present disclosure.

FIG. 4 illustrates a cryptographically encoded pointer 400 with various context information according to at least one embodiment of the present disclosure. Pointer 400 includes portions 402, 404, and 406 that may be similar to 302, 304, and 306 described above. In the embodiment depicted, plaintext context information 402 includes a power size 412, data key selector 418, and permissions 420. The ciphertext 404 may be ciphertext corresponding to underlying plaintext including version 422, type 424, message authentication code 426, other context information 428B, and address portion 430. Thus, the bit positions shown for these elements (e.g., 422, 424, 426, 428, 430) are for the underlying plaintext.

Although specific positions and encoding lengths are shown for various plaintext context information 402, other context information (e.g., 422, 424, 426, 428), address portion 430 and plaintext address portion 406, other embodiments may include any suitable information (such as an address in any suitable format and any suitable context information) encoded in a pointer in any suitable positions and using any suitable lengths. In various embodiments, a type of context information may be included either in the plaintext context information 402 section or encoded in the ciphertext 404 portion of the pointer. For example, the type 424 could be included in the plaintext context information 402 rather than being encoded in the ciphertext 404.

FIG. 4 is a diagram of an example pointer 400 according to at least one embodiment of the present disclosure. In particular, FIG. 4 shows a cryptographically encoded 128-bit pointer (address) in its base format, using power size 412 as part of the plaintext context information 402. In the example shown, the encoded pointer 400 includes a power size 412 (e.g., 6 bits in the example shown) indicating a size of a mutable plaintext portion 416 (e.g., 15 bits in the example shown) of the pointer 400 (e.g., a number of low order address bits that comprise the mutable plaintext portion 416 of the pointer 400, these bits may be manipulated freely by software for pointer arithmetic to finely control the portion of the allocation that is accessed using the pointer 400). In some embodiments, the power size 412 may include power (exponent) metadata bits that indicate a size based on a power of 2. This size could be, e.g., the size of the allocation or the power of 2 size that best fits the size of the allocation.

As shown in FIG. 4, the power size 412 may indicate the number of bits that compose the immutable plaintext portion 414 and the mutable plaintext portion 416. In certain embodiments, the total number of bits that make up the immutable plaintext portion 414 and the mutable plaintext portion 416 may be constant, with the sizes of the respective portions being dictated by the size metadata portion 602. For example, if the power metadata value is 0, there are no mutable plaintext bits and all 32 remaining address bits (immutable plaintext portion 414) are used as a tweak to generate ciphertext portion 404 from an address slice (e.g., a subset of the linear address bits), where the ciphertext portion 404 is adjacent to and more significant than the immutable plaintext portion 414. As a further example, if the power metadata value is 1, then there is one bit of mutable plaintext, if the power metadata value is 2, then there are 2 bits of mutable plaintext, up to 32 bits of mutable plaintext resulting in no immutable plaintext bits (414). The mutable plaintext portion 416 may be manipulated by software, e.g., for pointer arithmetic or other operations. The ciphertext portion 404 (e.g., 64 bits in the example shown) of the pointer 400 may be encrypted with a small tweakable block cipher (e.g., a SIMON, SPECK, or tweakable K-cipher at a 64-bit block size, or other variable bit size tweakable block cipher). The remaining address bits compose immutable plaintext portion 414 (e.g., 17 bits in the example shown) and are used as part of the tweak for the tweakable block cipher used to encrypt the ciphertext portion 404. While these bits are also a plaintext (non-encrypted) portion of the address, they cannot be modified by software (e.g., pointer arithmetic) like the bits of mutable plaintext portion 416 without causing the ciphertext portion 404 to decrypt incorrectly. The base pointer format shown in FIG. 4 allows for cryptographically describing object sizes and their location in memory. In some cases, the power size 412 portion could be provided as a separate parameter in addition to the pointer 400; however, in some cases (e.g., as shown) the bits of the power size 412 may be integrated with the pointer 400.

It should also be noted that in an alternative embodiments, the power size 412 may indicate the number of bits that compose the immutable plaintext portion 414, and thus dictate the number of bits remaining to make up the mutable plaintext portion 416. For example, if the power metadata value is 0, there are no immutable plaintext bits (414) and all 32 remaining address bits (mutable plaintext portion 416) may be manipulated by software. As a further example, if the power metadata value is 1, then there is one bit of immutable plaintext, if the power metadata value is 2, then there are 2 bits of immutable plaintext, up to 32 bits of immutable plaintext resulting in no mutable plaintext bits (416), and thus, no bits that can be manipulated by software.

Also, although pointer 400 is illustrated and described based on using 64 bits for the ciphertext portion 404, the pointer format is not intended to be so limited. The address slice and context information to be encrypted may be selected based on readily available 64-bit block encryption ciphers. However, an encryption cipher using any other block size (e.g., 96 bits, variable, etc.), may be used instead.

When a processor unit is running in a cryptographic mode and accessing memory using an encoded pointer (address) (e.g., a pointer formatted in the same or similar manner to pointer 400 of FIG. 4) to get the actual linear/virtual address memory location, the processor unit takes the encoded address format and decrypts the ciphertext portion (e.g., 404 of FIG. 4) using the variable number of immutable plaintext bits (e.g., 414 in FIG. 4) determined by the power size (e.g., 412 of FIG. 4) and a secret key. In some instances, the power size 412 and/or other context information may be included as part of the tweak for decrypting the ciphertext portion 404 (also referred to herein as "address tweak"). If the address decrypts incorrectly, the processor may cause a general protection fault (#GP) or page fault due to the attempted memory access with corrupted linear/virtual address.

Plaintext context information 402 also includes key selector 418. The key selector 418 may include an identifier of an address key that is used to encrypt the pointer 400 or a data key that is used to encrypt the data referenced by the pointer 400. In some embodiments, the context information may include both a data key selector and an address key selector. In some embodiments, the key selector 418 may be an index into an entry of a table that stores a plurality of keys, where the indexed entry includes the key to be used to encrypt/decrypt the data or pointer 400.

Such embodiments may be particularly useful for sharing data between software entities. For example, an entity may use the key selector 418 to reference a shared data key to encrypt data that is to be shared with one or more other entities (and such entities may use the key selector to reference the same key when accessing the data). In one example, data created by an application using a private key may be decrypted using the private key and then re-encrypted using the shared key to enable sharing of the data. This may be implemented, e.g., by having two different key selectors, such as 0 (for shared) and 1 (for private). In one embodiment, the application may load the data into a register (e.g., a general purpose register) using a memory access instruction specifying the private key and then issue another memory access instruction specifying the shared key to store the contents of the register back to the address. The pointer address may be the same address in each memory access instruction but may include or reference a different key selector. In this case the data is being written back to the same memory location (through the register) but using the different key.

The key selector may also be used to sandbox libraries within an application. For example, an application may limit a library's data use via a key indexed by the key selector so that the library cannot access other data of the application (e.g., the library would only have access to data that may be decrypted using that key).

In various embodiments, the software entity that generates a memory access instructions with a pointer including the key selector may have itself generated the key. For example, the software entity may have access to store the key to a table storing the keys.

If the key selector 418 references an address key, then the key selector 418 should be included in the plaintext context information 402 (so that it may be used in the decryption of the ciphertext 404 of the pointer 400). If the key selector 418 references a data key, the key selector 418 may be placed either within plaintext context information 402 or encrypted within the ciphertext 404. Placing the key selector 418 in the plaintext context information 402 may be advantageous as such an embodiment may allow decryption operations related to the data to commence before decryption of the ciphertext 404 is completed. For example, if the processor has the key selector 418 before the data (due to the key selector 418 being placed within plaintext context information 402), in counter mode, it may be able to compute a key stream before the data arrives. The processor may know the encoded address which it uses as the counter value, which is encrypted using the data key referenced by the key selector. When the data arrives, the processor may then simply perform an XOR operation with the calculated key stream to decrypt the associated data.

Plaintext context information 402 also includes permissions 420, which may alternatively be encrypted within the ciphertext 404. Permissions 420 may include any suitable access control information for the memory location, such as read, write, and execute bits identifying whether the entity issuing an instruction referencing the pointer 400 may read, write, or execute the object at the linear address referenced by the pointer 400. In some embodiments, permissions 420 may include an identification of an owner, thus any entity desiring to access the data may need to accurately identify the owner of the data.

The plaintext corresponding to ciphertext 404 includes version 422, which may alternatively be included in the plaintext context information 402. The version 422 may be a random value or a deterministically different value for a memory allocation may be changed when an allocation is freed and reallocated in order to protect against use after free attacks. In one example, the version 422 for a particular allocation may be changed (e.g., incremented) each time a portion of memory is newly allocated (e.g., via a malloc or new command). When the version is used in the data tweak, the entity that previously used the allocation will no longer be able to correctly decrypt the data as it will have had a different version for the data.

The plaintext corresponding to ciphertext 404 includes type 424, which may alternatively be included in the plaintext context information 402. The type 424 may be used to specify a type of data (e.g., floating point numbers, scalar integers, vector integer, object, etc.) stored in the allocation, e.g., for programming languages that specify different classes. In some embodiments, when the pointer 400 is accessed, the type 424 specified in the context information can be matched against an expected type ID specified in the program to mitigate type confusion vulnerabilities.

The plaintext corresponding to ciphertext 404 includes message authentication code 426. The MAC 426 may be computed over any suitable portion of the pointer 400 including any of the context information and/or any portion (or all) of the linear address. Prior to accessing data or code, the processor unit may recompute the MAC 426 from the corresponding portion(s) of the linear address and/or context information. If the recomputed MAC matches the one embedded in the pointer 400, then the pointer is considered to be valid for use at that access site. This check may verify the integrity of the pointer (to detect forgery of the pointer). If the check fails, the memory access is not allowed to proceed.

In some embodiments, the MAC 426 may be generated by calculating a hash function using the relevant bits of the pointer 400. For example, in one embodiment, a Secure Hash Algorithm 3 (SHA-3) algorithm is used to compute the MAC 426.

Figure 5:
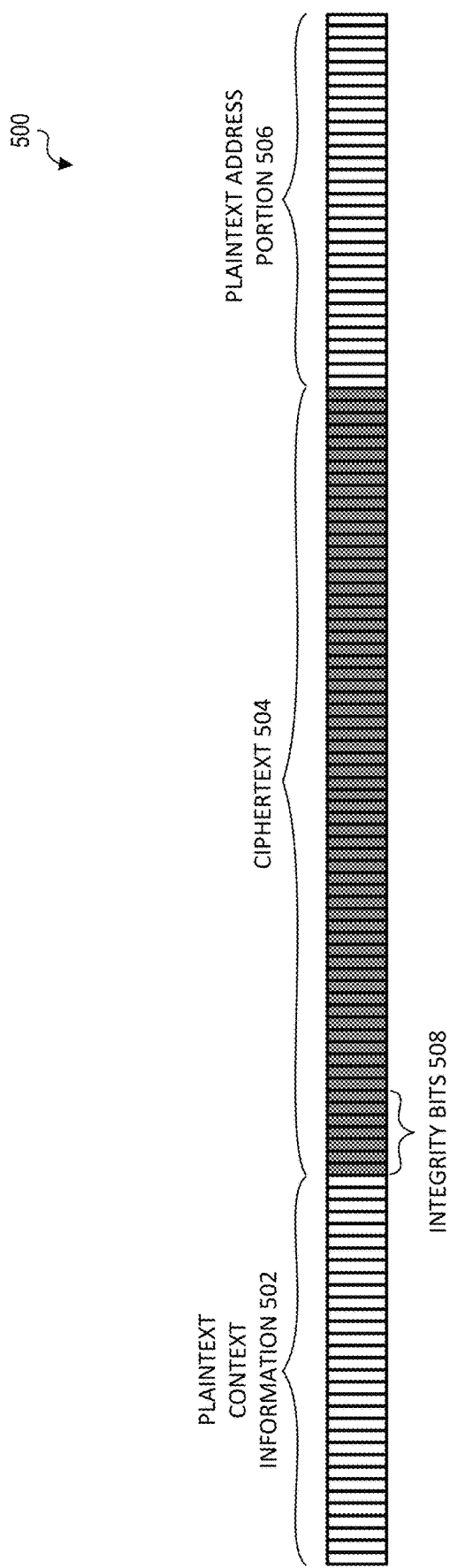
FIG. 5 illustrates a cryptographically encoded pointer with context information including integrity bits according to at least one embodiment of the present disclosure.

FIG. 5 illustrates a cryptographically encoded pointer 500 with context information including integrity bits 508 according to at least one embodiment of the present disclosure. As an alternative to including a MAC (e.g., 426) in the context information, the plaintext used to generate the ciphertext 504 of pointer 500 (which includes plaintext context information 502, ciphertext 504, and plaintext address portion 506) may include a plurality of integrity bits 508 that are set to a particular value (e.g., all zeros, all ones, or other suitable value). The integrity bits 508 may be context information, part of the encoded linear address, or a combination thereof. When the block cipher used to decrypt the ciphertext 504 has sufficient diffusion, when one or more bits of the ciphertext 504 are flipped during a forgery attempt (or due to any other reason), the diffusion may result in changes to the underlying integrity bits 508 when the ciphertext is decrypted (e.g., on average 50% of the integrity bits may flip). Thus, modification of the pointer may be detected using the integrity bits 508 without having to calculate a MAC. In one embodiment, the plaintext integrity bits 508 are all set to zero and thus when the ciphertext 504 is decrypted if one or more of the integrity bits 508 are set to one, then a determination that the ciphertext 504 has been manipulated is detected.

Referring again to FIG. 4, in various embodiments, the other context information 428 (whether in the plaintext 428A of the pointer 400 or the underlying plaintext of the context information 428B that is encrypted within ciphertext 404 of the pointer 400) may include any suitable context information. For example, context information 428 may include an index into a table that includes any suitable information (e.g., any suitable combination of the context information described herein or other suitable information could be included in such a table).

As another example, context information 428 may include a timestamp indicative of an amount of time for which the pointer 400 is valid. For example, the context information 428 may include a timestamp specifying a start time at which a pointer 400 is valid and a duration for which the pointer 400 is valid. As another example, the context information 428 may include a timestamp specifying an end time at which a pointer 400 expires. The timestamp information may be compared against a wall clock time that the processor unit maintains to determine if the pointer 400 is still valid and the processor may prevent the memory access if the pointer is not valid.

As another example, the context information 428 may include one or more bits reserved for user-defined values. The software entity that issues a memory access comprising the pointer may define the values that are placed in the user-defined values.

As another example, the context information 428 may include information that may be used in garbage collection operations. Many programming languages utilize automatic memory management that may utilize a procedure commonly referred to as garbage collection. The garbage collection procedure may track how memory is being referenced within an application and detect when active references to memory have been eliminated or have expired (e.g., by detecting orphan objects that are no longer referenced from stack memory, global variables, or registers, whether directly or indirectly). The underlying memory may then be reclaimed and used for other purposes. In at least some embodiments, the garbage collection operates on a heap in memory in which objects or dynamic data is stored. The context information 428 could include, for example, usage information indicating how recently data referenced by the pointer was accessed. A garbage collector may iterate through pointers and determine which pointers were least recently used. The garbage collector may use this information in determining how to arrange objects.

As another example, the context information 428 may include a privilege level. The privilege level may indicate, e.g., a user or supervisor mode of the software for which the memory was allocated. As another example, context information 428 may include an identifier of a compartment performing the memory access. In one example, the context information 428 may include an indication of whether the data of the allocation is shared data or not.

In another example, context information 428 may include information associated with a function call. For example, when a function call is made to another software entity, a return address comprising a pointer (e.g., 400) to code may be stored on a stack at a particular location to allow the program flow to continue when the function call is over. If a pointer (e.g., 400) is being used as the return address, the context information of the pointer may include information about where the return address was stored on a stack in order to prevent an entity from changing the location of a return address on the stack. This may help protect against return oriented programming attacks. Other embodiments may place this information on the stack as a separate variable or it may be stored on a separate shadow stack.

As another example, the context information 428 may include state information indicating how deep into a caller's stack frame a callee went (e.g., the callee may go into the caller's stack frame to set up arguments). If the callee goes too far and, e.g., overrides local variables of the caller, then the state information may indicate unauthorized activity. In some embodiments, the context information 428 may be a delta value (e.g., a watermark) noting how far past the return address location the callee has intruded into the caller's stack frame (the dividing line between the two stack frames may be the location the return address is stored on the stack). Sometimes applications expect this behavior because arguments are passed on the caller's stack frame to the callee function. These values, however, are not re-read by the caller as they are only intended for the callee. By tracking which values were accessed on the caller's stack by the callee using the callee's stack pointer, it is possible for the processor to raise a fault if the caller (after a return back to the caller) re-reads those values, which would not be expected if the values were intended to be arguments to a function call to the callee. As the caller may overwrite those values with new data, in some embodiments, the fault may be limited to a read before a write/load before a store. The return function may simply overwrite the data on the caller's stack frame up to the watermark with special values to indicate that the memory is not to be re-read by the caller (but can be written to).

In some embodiments, the context information 428 may include an indication of whether a code address (e.g., as indicated by an instruction pointer) should be used as a tweak to decrypt data. In some instances, the code address may be bound the data encryption by using the code address (or value derived therefrom) in a tweak to encrypt the data. When the data is accessed, the pointer may include an indication that the code address (or value derived therefrom) should be used to decrypt the data. In such embodiments, decryption of the data could be limited, e.g., to the same function that encrypted the data. In some embodiments, some of the least significant bits of the code address may be omitted from the value used by the tweak so that a group of contiguous code (e.g., code of the same function rather than code at a single address) may access the data.

In another embodiment, the context information could include or be associated with the initial point at where a function was entered. Thus, the tweak used to encrypt the data could utilize the address where a function issuing the memory access was entered.

In various embodiments, the context information 428 may include information associated with a code path. For example, the context information 428 may include a hash of the code path or a hash of critical events (e.g., conditional branches) leading up to the issuance of the memory access instruction that includes the pointer. Thus, the pointer may only be used successfully if that particular hash has been accumulated on the control flow to the point where the pointer is invoked.

In another embodiment, when a virtual machine or other software entity is migrated, the context information 428 may include a state bit indicating whether a particular region of memory of the virtual machine has already been migrated.

In yet another embodiment, the context information 428 may include bounds information, such as the start and end of a region of data.

In another embodiment, the context information 428 may include taint tracking information. For example, use of the taint tracking information may ensure that only a single valid pointer to a region is present at a time. For example, the context information 428 may include a device ID that is assigned to the allocation when it is created and subsequent users (e.g., software entities that are different from the entity that originally requested the allocation) of the pointer may include the device ID in the pointer in order to access the data.

Any other suitable context information may be included within context information 428, such as one or more of a size indicating the bytes of memory that are in an allocation referenced by the pointer, a tag containing randomized bits associated with the memory address, or a cryptographic context identifier including a randomized or deterministically unique value for a memory address, or other suitable context information.

One or more pointer encoding embodiments may use any one item of context information as part of a tweak (address tweak or data tweak), or may use any suitable combination of context information items in a tweak. The context information used in the tweak may be stored in any type of storage, which may be based on particular needs and implementations. For example, one or more items of context information may be embedded in a 128-bit pointer (or other length pointer, e.g., 256-bit pointer), such as pointer 400. In one scenario, context information may be stored in the upper most bits of the unencrypted pointer. Other example types of storage for context information (which could be used in addition to embedding the context information in the pointer 400) include, but are not necessarily limited to, embedding the context information within another operand that is provided to the pointer encryption instructions and to the memory access instructions, and/or storing the context information in a control register.

Figure 6:
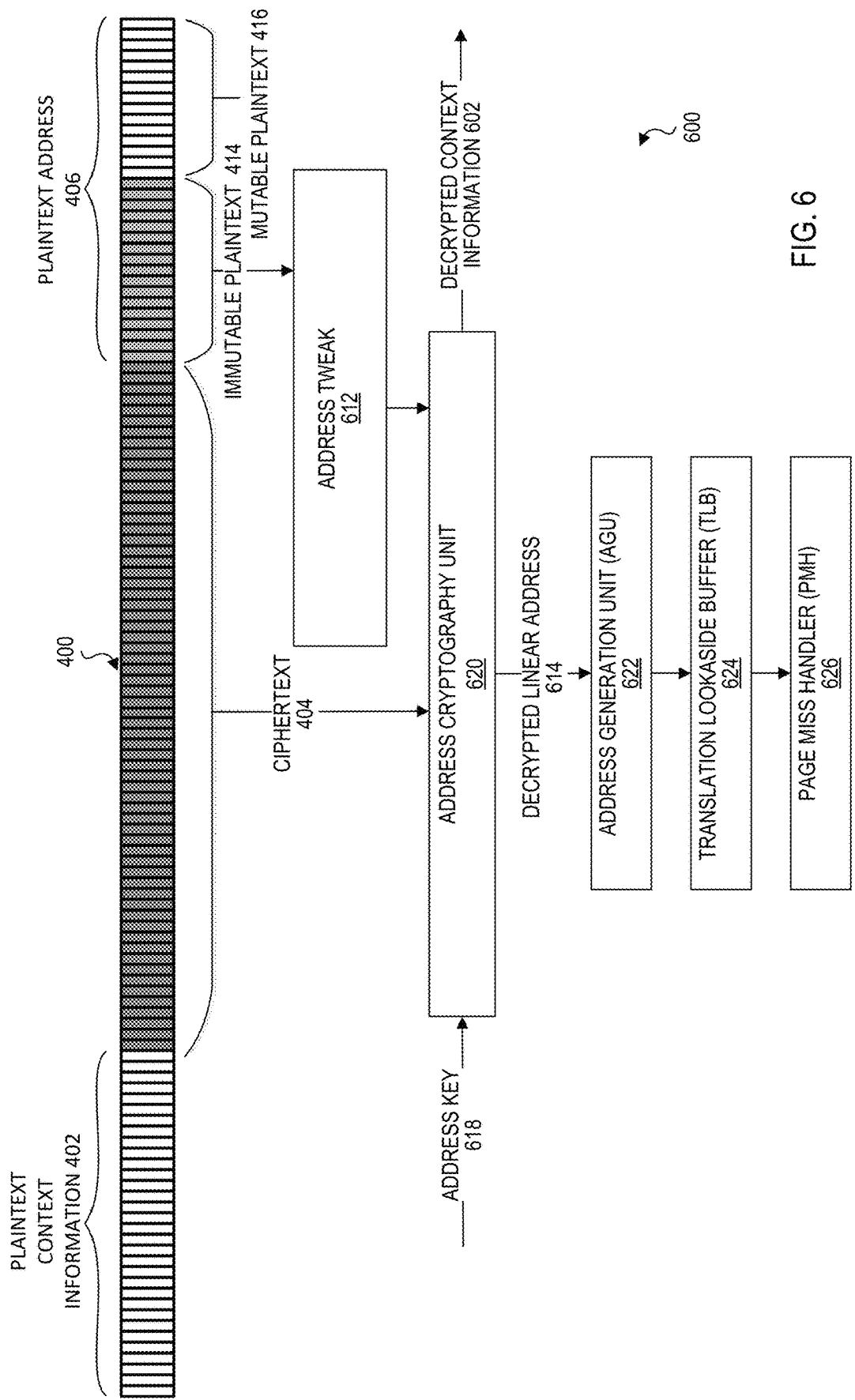
FIG. 6 is a diagram of an environment for decrypting a cryptographically encoded pointer to produce a linear address according to at least one embodiment of the present disclosure.

FIG. 6 is a diagram 600 of an environment for decrypting a cryptographically encoded pointer to produce a linear address according to at least one embodiment of the present disclosure. In this example, a pointer 400 is cryptographically encoded based on a memory address (e.g., linear or virtual address) of allocated memory, as previously described herein. Pointer 400 includes plaintext context information 402, ciphertext 404, an immutable plaintext portion 414, and a mutable plaintext portion 416. An address cryptography unit 620 is used to decode pointer 400 to obtain a decrypted linear address 614 as well as decrypted context information 402 (which may include plaintext version of the context information that was encrypted within the ciphertext 404). Additional hardware units such as an address generation unit (AGU) 622, a translation lookaside buffer (TLB) 624, and a page miss handler (PMH) 626, for example, transform the decrypted linear address 614 into a physical address for accessing data in the allocated memory referenced by pointer 400.

Address cryptography unit 620 includes a cryptographic algorithm for decrypting the ciphertext portion 404 of pointer 400. The ciphertext portion 404 may include an encrypted slice of the memory address (e.g., linear address) that points to (or references) the allocated memory. The ciphertext portion 404 may also include encrypted context information, such as any of that described herein. In at least one embodiment, address cryptography unit 620 includes a block cipher that performs decryption of the encrypted address slice (and optionally context information) based on an address key 618 and a second input (also referred to herein as "tweak" or "address tweak") 612. Generally, a block cipher is an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which is a fixed-size input that is random, pseudorandom, or nonrepeating, depending on the particular block cipher requirements. For embodiments using a block cipher that requires an initialization vector, address tweak 612 may compose all or part of the initialization vector. In some embodiments, the address tweak may comprise one or more items of context information from the pointer (e.g., power size 412 in the example of FIG. 4 or any of the other context information described herein), from another register, from memory, and/or from an instruction operand.

Embodiments disclosed herein allow for various pointer encodings and, therefore, various tweaks. A tweak (address tweak or data tweak) may include a random value, a deterministically different value for different memory allocations, a semantic meaning that cannot be randomized or generated as an arbitrary value, or any suitable combination thereof. Randomness and/or deterministically different values may be used as a tweak (or as part of a tweak) to diversify the cryptography. Such tweaks are referred to herein as "crypto context identifier" or "crypto context ID" and may take the form of a random tweak (or initialization vector), a deterministic tweak (or initialization vector) generated and controlled by trusted software, or a random cryptographic key. Certain tweaks, however, may have a semantic meaning that cannot be randomized or generated as an arbitrary value. For example, a size field in context information is used by the CPU to select ranges of pointer bits for processing. Accordingly, the size portion of an encoded pointer, such as pointer 400, is to have a well-defined interpretation for each size value.

In the embodiment shown in FIG. 4, address tweak 612 is obtained entirely from pointer 400 without additional lookups in other storage locations (e.g., registers, other memory, instruction operands). In one embodiment, address tweak 612 may include one or more of the immutable plaintext bits (e.g., 414), padding for the mutable plaintext bits (e.g., 416), and any of the context information described herein (other than context information that is encrypted within ciphertext 404). The padding can be any reserved value that is used to fill the variable, modifiable part of the plaintext address (mutable plaintext portion 416). For example, the padding could be all zeros, all ones, or any other designated value. If the size metadata does not define any mutable plaintext portion (e.g., if size value=0) then padding is not needed. Conversely, if the size metadata defines the mutable plaintext portion as comprising all of the plaintext address bits (e.g., if the power size value=32), then no immutable plaintext portion is encoded and the entire 32 bits are filled with padding (e.g., all zeros). In the example pointer 400, the immutable plaintext portion includes 17 bits and the padding includes 15 bits. Address key 618 may be generated or obtained in any suitable manner as previously described herein, for example, with respect to privileged system component 142 and key creation module 148 of FIG. 1.

Any suitable block cipher cryptographic algorithm may be implemented as address cryptography unit 620. For example, a small tweakable block cipher (e.g., a SIMON, SPECK, tweakable K-cipher at a 64-bit block size, or other variable bit size tweakable block cipher may be used). The Advanced Encryption Standard (AES) offers various block ciphers that may be implemented in any number of ways to achieve encryption/decryption of a block of data such as ciphertext 404. For example, an AES xor-encrypt-xor (XEX) based tweaked-codebook mode with ciphertext stealing (AES-XTS) may be suitable. In other embodiments, an AES counter (CTR) mode of operation could be implemented.

Once decryption of the ciphertext portion 404 is successful, address cryptography unit 620 can also generate decrypted linear address 614 based on the decrypted slice of the linear address. The decrypted slice of the linear address is then concatenated with the immutable plaintext portion and the mutable plaintext portion 416. In addition, sign extension may be performed on the most significant bit of the decrypted slice of the linear address to pad or set the upper bits to a particular value.

Figure 7:
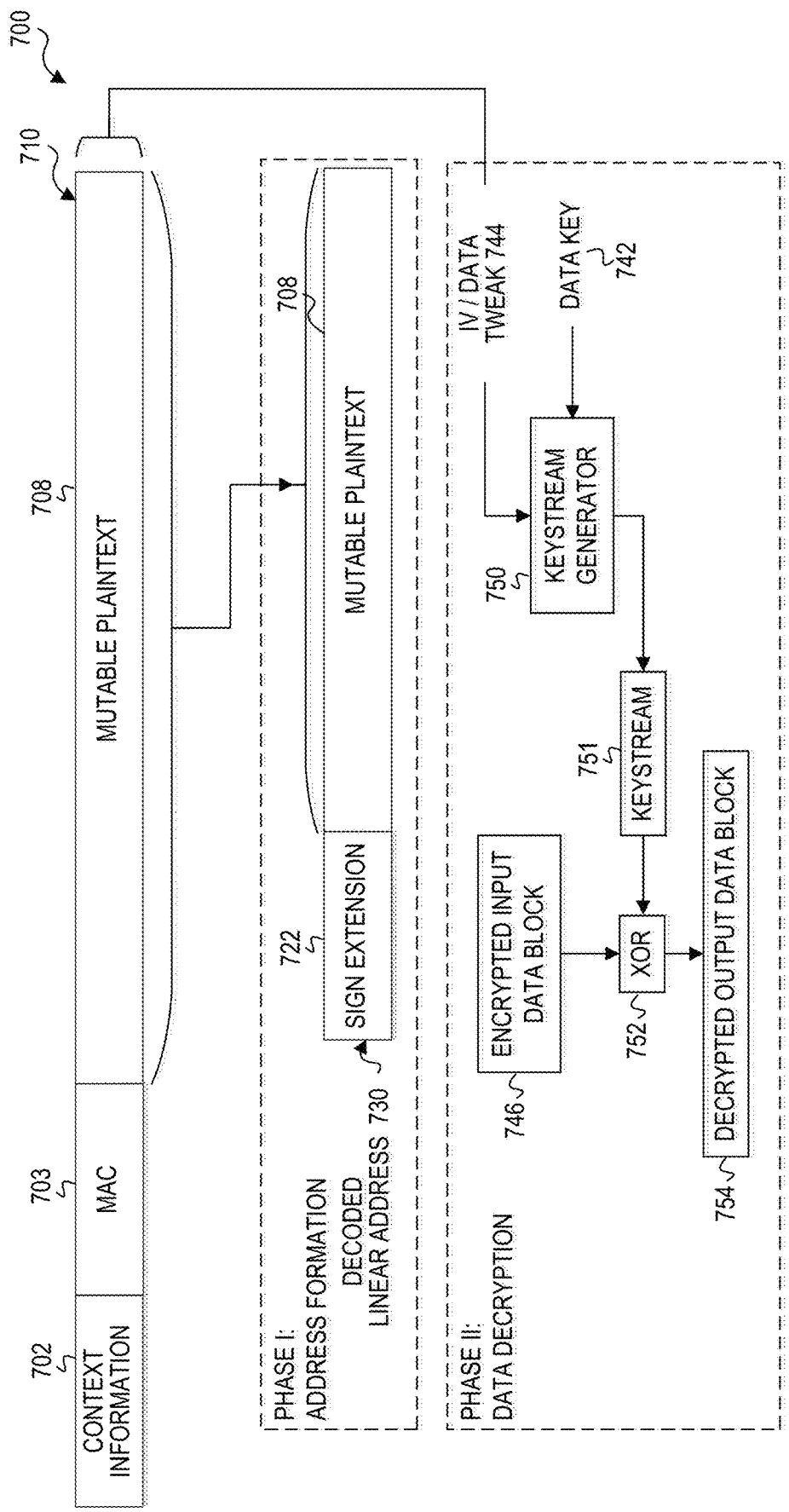
FIG. 7 is flow diagram illustrating an example process of binding yet another cryptographically encoded pointer to the encryption of the data referenced by that pointer according to at least one embodiment of the present disclosure.

FIG. 7 is a detailed flow diagram illustrating an example process 700 of obtaining data referenced by another embodiment of an encoded pointer 710, where encryption of the data is bound to the contents of the pointer. At least some portions of process 700 may be executed by hardware, firmware, and/or software of the computing device 100. Pointer 710 may be embodied as a 128-bit (or other length) encoded linear address including a context information portion 702, MAC 703, and a mutable plaintext address portion 708. Context information portions 702 may include any of the context information discussed herein. In one embodiment, context information portion 702 includes a tag/version portion that may comprise temporal safety bits, which are randomly generated each time a pointer is encoded for a requested memory allocation. Alternatively, the tag/version portion can comprise a version number or any deterministically unique value for a requested memory allocation. For example, the tag/version portion may be a sequentially incremented number that is generated each time a pointer is encoded for a requested memory allocation. Although either approach may be used, in this embodiment in which none of the address bits are encrypted, a tag with randomly generated bits may provide greater protection against an attack as randomly generated bits are more difficult to determine than deterministically different values such as sequentially incremented numbers. For other embodiments disclosed herein, in which a portion of the address is encrypted, a version may be more desirable as the encryption provides protection against an attack, and the version number uses less resources to generate. MAC 703 may be calculated over any suitable portion of the encoded pointer 710 to provide integrity verification.

It should be noted that the context information portion 702, MAC 703, and address portion 708 may be configured with various numbers of bits. In one embodiment, context information 702 may include a 2-bit reserved portion that can be designated as a supervisor bit and an encoded bit indicator. The supervisor bit can indicate whether the address is located within the supervisor address space (e.g., "1") or within the user mode address space (e.g., "0"). The encoded bit indicator can be set to the opposite value of the supervisor bit to indicate that the pointer is encoded (e.g., with tag/version bits) or can be set to the same value of the supervisor bit to indicate that the pointer is not encoded.

The operations of process 700 are identified in two phases: address formation (Phase I), and data decryption (Phase II). Process 700 does not include an address decryption phase because the encoded linear address is not encrypted. Instead, the linear address is encoded in mutable plaintext address portion 708.

In Phase I, a decoded linear address 730 can be formed from the encoded pointer 710. In at least one embodiment, the uppermost bits 722 (e.g., context information 702 and MAC 703) that are not part of the linear address can be set to the same bit value (e.g., 0 or 1). The bits of the mutable plaintext address portion 708 make up the lower bits of the decoded linear address 730.

The decoded linear address 730 is used to find the memory location of the encrypted data to be decrypted in Phase II. The encrypted data is decrypted by a decryption algorithm such as keystream generator 750. In at least one embodiment, keystream generator 750 can be implemented as an AES-CTR mode block cipher, at a particular size granularity (any suitable size). In this embodiment, the contents of the encoded pointer are used as the initialization vector (IV) or data tweak 744. In particular, context information 702 (or subset thereof) and/or the bits of plaintext address portion 708 may form the data tweak (or IV) for decrypting the encrypted data. Keystream generator 750 encrypts data tweak 744 based on a data key 742 to generate a keystream 751. An XOR operation 752 is then performed on keystream 751 and an encrypted input data block (or cache line) 746 selected from the memory location referenced by the decoded linear address 730. The granularity of the encrypted input data block 746 matches the keystream 751 output from of the keystream generator 750, and the XOR operation 752 produces a decrypted output data block 754. Additionally, in some embodiments, other context information that is not located in the pointer 710 could also be used in the data tweak 744.

FIGS. 8-12 below provide some example computing devices, computing environments, hardware, software or flows that may be used in the context of embodiments as described herein.

Figure 8:
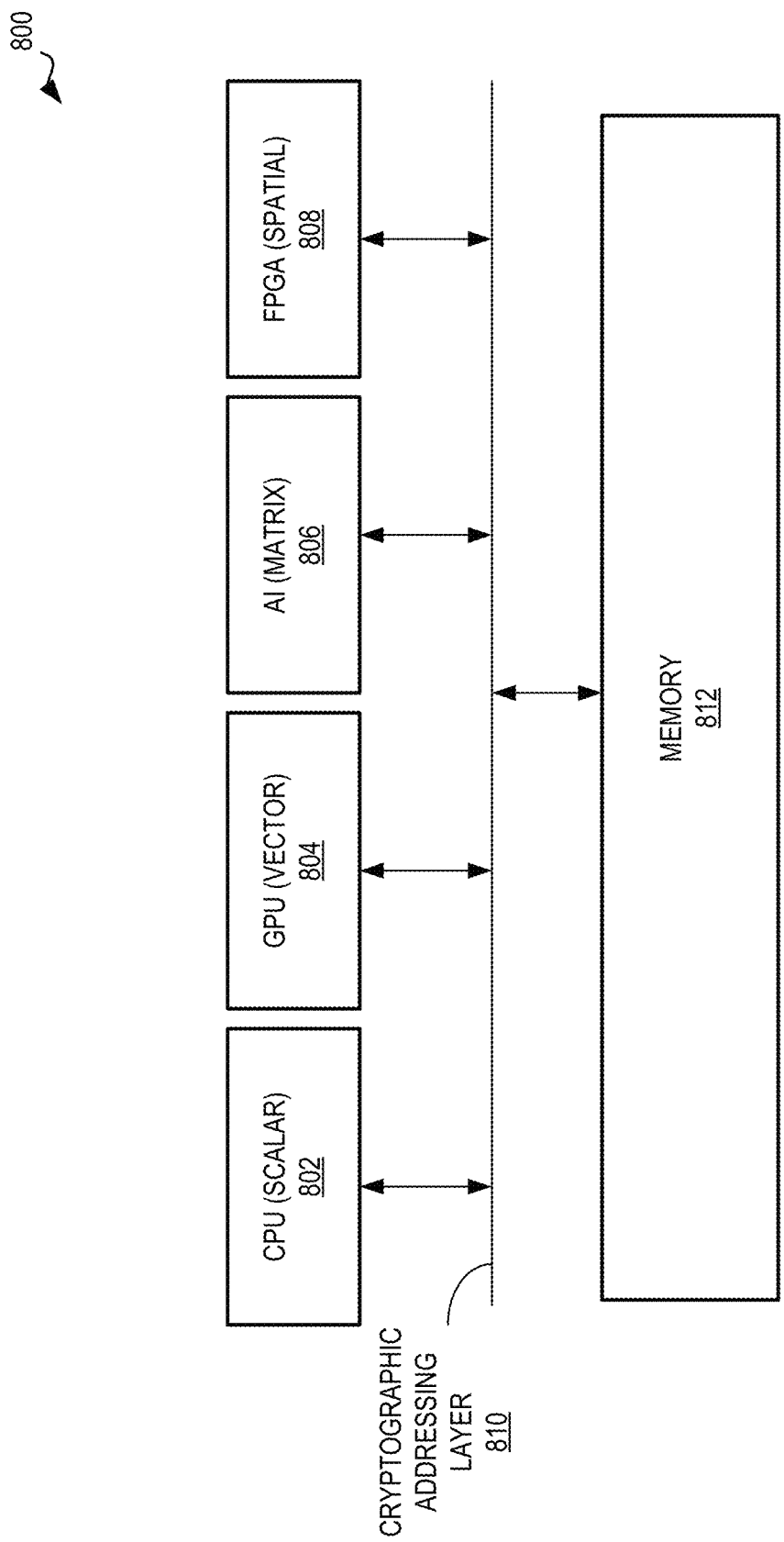
FIG. 8 is a block diagram illustrating an example cryptographic computing environment according to at least one embodiment.

FIG. 8 is a block diagram illustrating an example cryptographic computing environment 800 according to at least one embodiment. In the example shown, a cryptographic addressing layer 810 extends across the example compute vectors (e.g., processor units) central processing unit (CPU) 802, graphical processing unit (GPU) 804, artificial intelligence (AI) 806, and field programmable gate array (FPGA) 808. For example, the CPU 802 and GPU 804 may share the same virtual address translation for data stored in memory 812, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 812 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

FIGS. 9-14 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 9-11.

Figure 9:
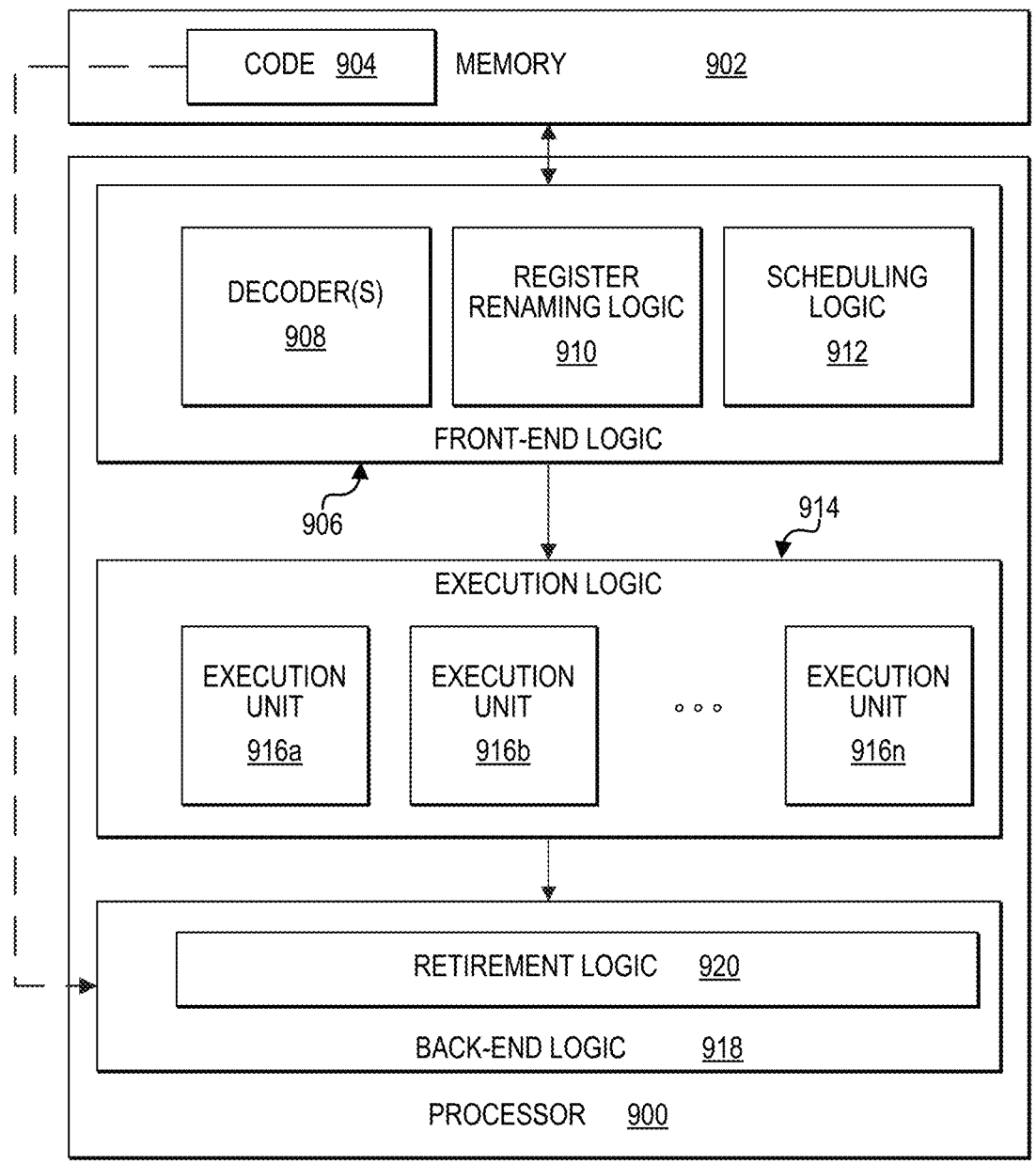
FIG. 9 is a block diagram illustrating an example processor according to at least one embodiment.
Figure 10:
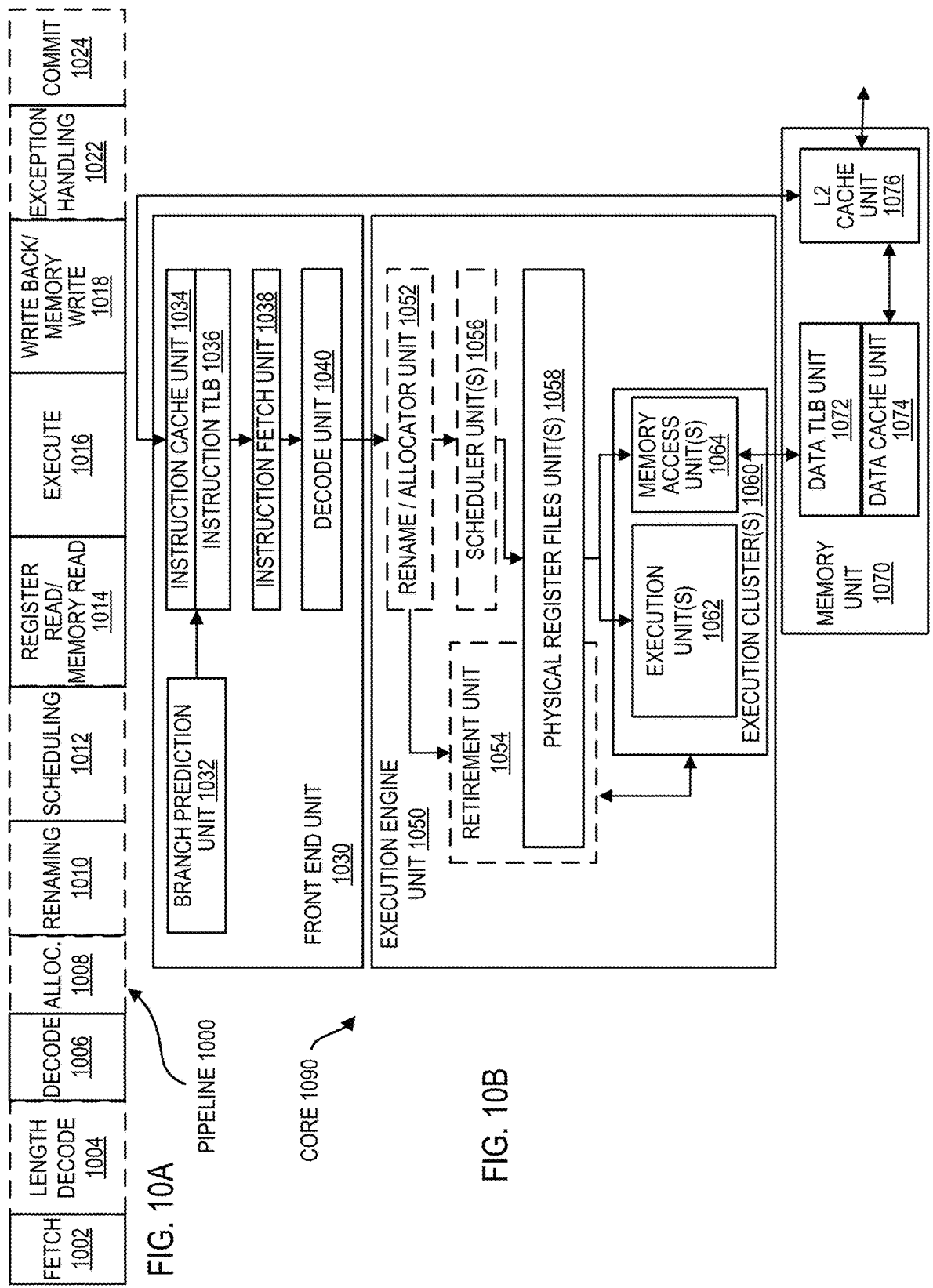
FIG. 10A is a block diagram illustrating both an exemplary in-order pipeline and an exemplary register renaming, out-of-order issue/execution pipeline in accordance with certain embodiments.
FIG. 10B is a block diagram illustrating both an exemplary embodiment of an in-order architecture core and an exemplary register renaming, out-of-order issue/execution architecture core to be included in a processor in accordance with certain embodiments.

FIG. 9 is an example illustration of a processor according to an embodiment. Processor 900 is an example of a type of hardware device that can be used in connection with the implementations shown and described herein (e.g., processor 102). Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10A is a block diagram illustrating both an exemplary in-order pipeline and an exemplary register renaming, out-of-order issue/execution pipeline according to one or more embodiments of this disclosure. FIG. 10B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 10A-10B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. Processor core 1090 and memory unit 1070 are examples of the types of hardware that can be used in connection with the implementations shown and described herein (e.g., processor 102, memory 120). The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like. In addition, processor core 1090 and its components represent example architecture that could be used to implement logical processors and their respective components.

The front end unit 1030 includes a branch prediction unit 1032 coupled to an instruction cache unit 1034, which is coupled to an instruction translation lookaside buffer (TLB) unit 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers (GPRs). In at least some embodiments described herein, register units 1058 are examples of the types of hardware that can be used in connection with the implementations shown and described herein (e.g., registers 110). The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1062 may also include an address generation unit to calculate addresses used by the core to access main memory (e.g., memory unit 1070) and a page miss handler (PMH).

The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory. In addition, a page miss handler may also be included in core 1090 to look up an address mapping in a page table if no match is found in the data TLB unit 1072.

By way of example, the exemplary register renaming, out-of-order issue/execution core architecture may implement the pipeline 1000 as follows: 1) the instruction fetch unit 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the scheduling stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
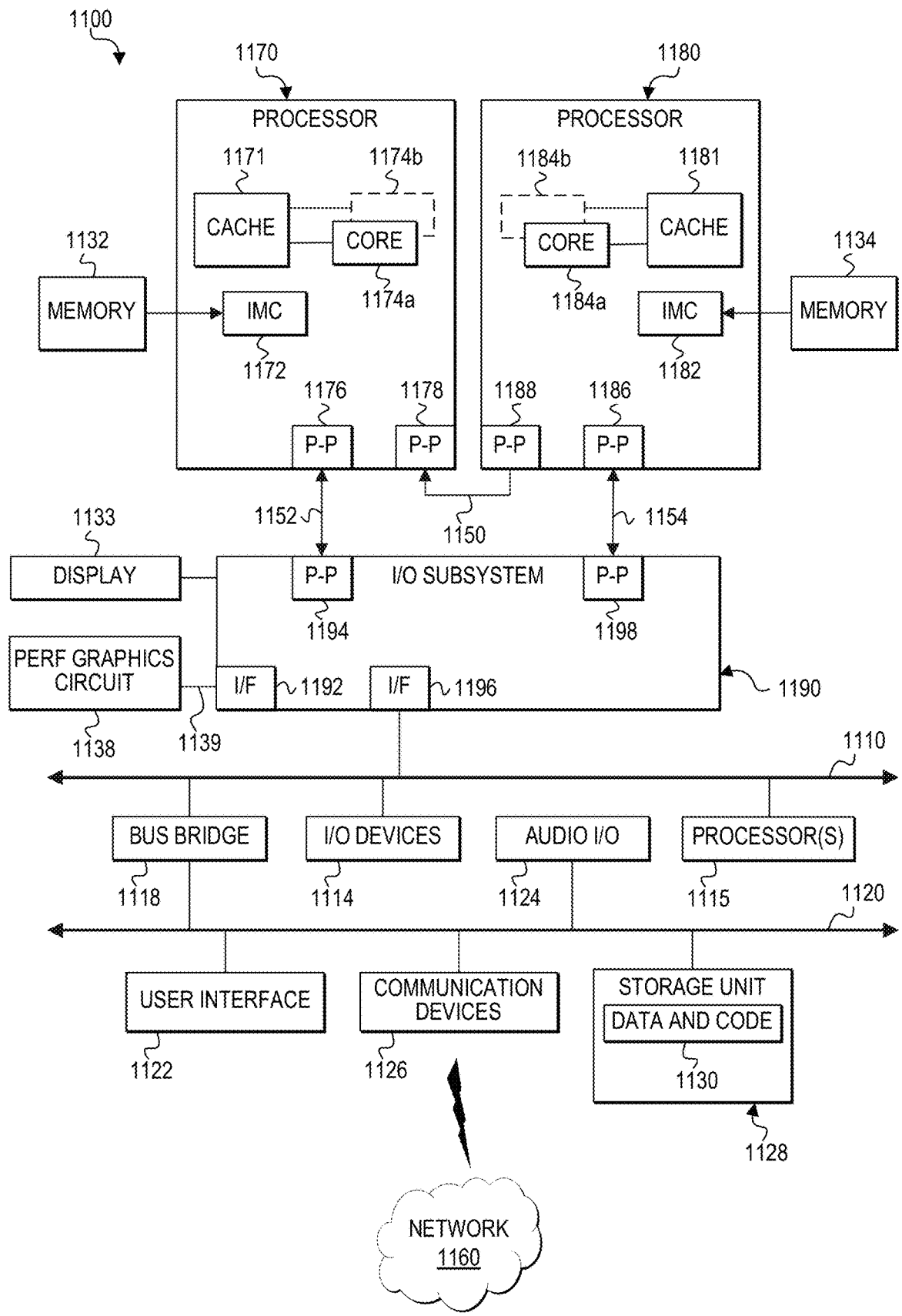
FIG. 11 is a block diagram of an example computer architecture according to at least one embodiment.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing systems or computing devices described herein may be configured in the same or similar manner as computing system 1100.

Processors 1170 and 1180 may be implemented as single core processors 1174*a* and 1184*a* or multi-core processors 1174*a*-1174*b* and 1184*a*-1184*b*. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1100. Moreover, processors 1170 and 1180 are examples of the types of hardware that can be used in connection with the implementations shown and described herein (e.g., processor 102).

Processors 1170 and 1180 may also each include integrated memory controller logic (IMC) 1172 and 1182 to communicate with memory elements 1132 and 1134, which may be portions of main memory locally attached to the respective processors. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with an input/output (I/O) subsystem 1190 via individual point-to-point interfaces 1152 and 1154 using point-to-point interface circuits 1176, 1186, 1194, and 1198. I/O subsystem 1190 may also exchange data with a high-performance graphics circuit 1138 via a high-performance graphics interface 1139, using an interface circuit 1192, which could be a PtP interface circuit. In one embodiment, the high-performance graphics circuit 1138 is a special-purpose processor, such as, for example, a high-throughput MIC processor, a network or communication processor, compression engine, graphics processor, GPGPU, embedded processor, or the like. I/O subsystem 1190 may also communicate with a display 1133 for displaying data that is viewable by a human user. In alternative embodiments, any or all of the PtP links illustrated in FIG. 11 could be implemented as a multi-drop bus rather than a PtP link.

I/O subsystem 1190 may be in communication with a bus 1110 via an interface circuit 1196. Bus 1110 may have one or more devices that communicate over it, such as a bus bridge 1118, I/O devices 1114, and one or more other processors 1115. Via a bus 1120, bus bridge 1118 may be in communication with other devices such as a user interface 1122 (such as a keyboard, mouse, touchscreen, or other input devices), communication devices 1126 (such as modems, network interface devices, or other types of communication devices that may communicate through a computer network 1160), audio I/O devices 1124, and/or a storage unit 1128. Storage unit 1128 may store data and code 1130, which may be executed by processors 1170 and/or 1180. In alternative embodiments, any portions of the bus architectures could be implemented with one or more PtP links.

Program code, such as code 1130, may be applied to input instructions to perform the functions described herein and generate output information. The output information may be applied to one or more output devices, in known fashion. For purposes of this application, a processing system may be part of computing system 1100 and includes any system that has a processor, such as, for example; a digital signal processor (DSP), a microcontroller, an application specific integrated circuit (ASIC), or a microprocessor.

The program code (e.g., 1130) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
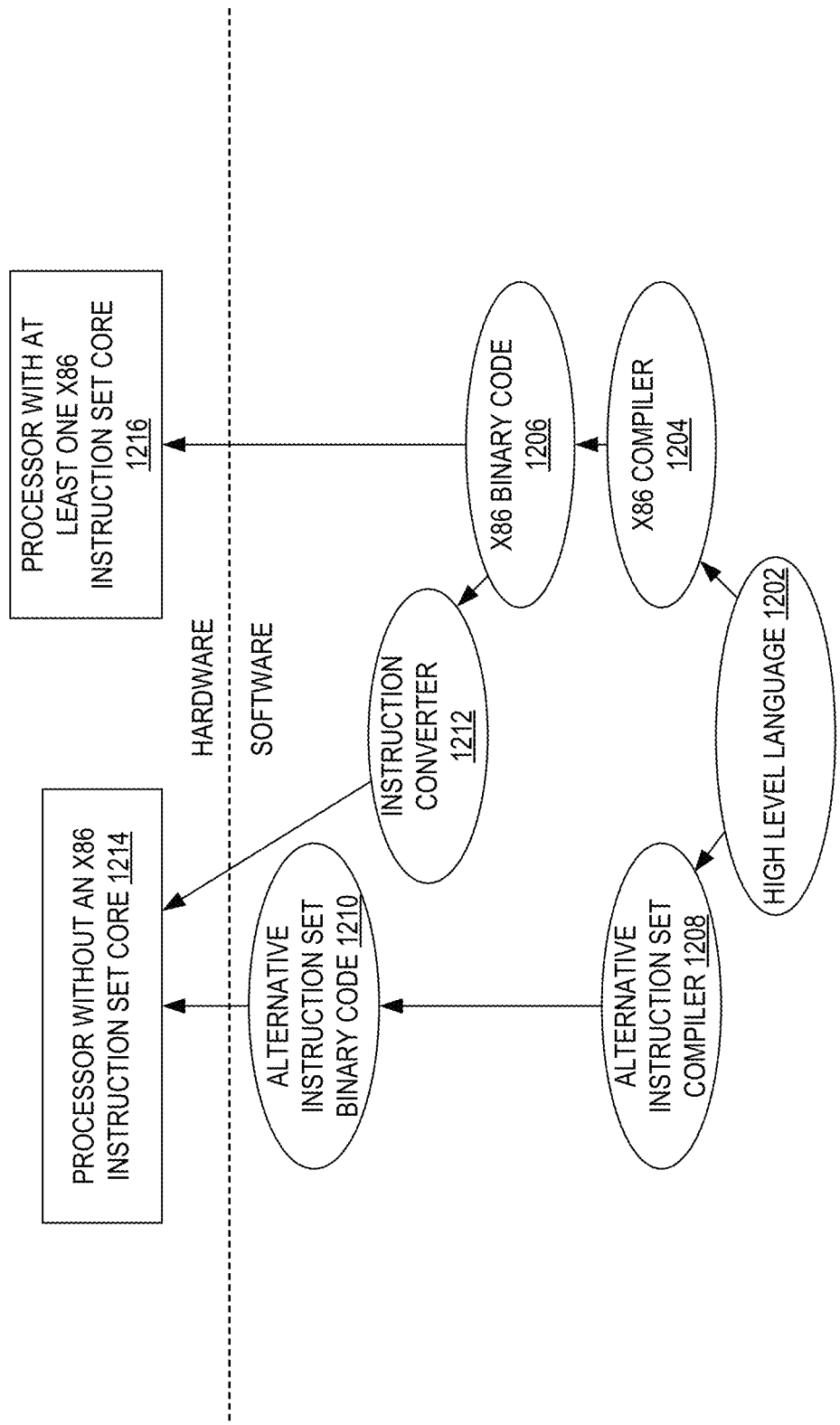
FIG. 12 is a block diagram contrasting the use of a software instruction converter to convert binary instructions in a source instruction set to binary instructions in a target instruction set according to embodiments of the present disclosure.

FIG. 12 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a processor unit, comprising a first memory element to store an encoded pointer to a memory location, wherein the encoded pointer comprises first context information and a slice of a memory address of the memory location, wherein the first context information includes an identification of a data key; and circuitry to decode the encoded pointer to obtain the memory address of the memory location; and use the memory address obtained by decoding the encoded pointer to access encrypted data at the memory location; and decrypt the encrypted data based on the data key.

Example 2 may include the subject matter of Example 1, wherein the encoded pointer has a length of at least 128 bits.

Example 3 may include the subject matter of any one of Examples 1-2, wherein the first context information is plaintext within the encoded pointer and the encoded pointer further comprises encrypted second context information.

Example 4 may include the subject matter of Example 3, wherein the encrypted second context information is encrypted in a block of the encoded pointer that further comprises an encrypted portion of the memory address.

Example 5 may include the subject matter of Example 3, the circuitry to decrypt the encrypted data based further on a first tweak, the first tweak including one or more bits derived, at least in part, from the first context information and the second context information.

Example 6 may include the subject matter of any one of Examples 1-5, wherein the first context information comprises a message authentication code calculated based on at least a portion of the memory address.

Example 7 may include the subject matter of any one of Examples 1-6, wherein the first context information comprises permission bits indicating a level of access authorized for the memory location.

Example 8 may include the subject matter of any one of Examples 1-7, wherein the first context information comprises type bits indicating a class of the encrypted data in the memory location.

Example 9 may include the subject matter of any one of Examples 1-8, wherein the first context information comprises version bits representing a deterministically different value associated with the encoded pointer.

Example 10 may include the subject matter of any one of Examples 1-9, wherein the first context information comprises a lookup tag to index to an entry of a table, wherein the entry comprises second context information.

Example 11 includes a method, comprising storing, in a register, an encoded pointer to a memory location, wherein the encoded pointer comprises first context information and a slice of a memory address of the memory location, wherein the first context information includes an identification of a data key; decoding the encoded pointer to obtain the memory address of the memory location; using the memory address obtained by decoding the encoded pointer to access encrypted data at the memory location; and decrypting the encrypted data based on the data key.

Example 12 may include the subject matter of Example 11, wherein the encoded pointer has a length of at least 128 bits.

Example 13 may include the subject matter of any one of Examples 11-12, wherein the first context information is plaintext within the encoded pointer and the encoded pointer further comprises encrypted second context information.

Example 14 may include the subject matter of Example 13, wherein the encrypted second context information is encrypted in a block of the encoded pointer that further comprises an encrypted portion of the memory address.

Example 15 may include the subject matter of Example 13, further comprising decrypting the encrypted data based further on a first tweak, the first tweak including one or more bits derived, at least in part, from the first context information and the second context information.

Example 16 may include the subject matter of any one of Examples 11-15, wherein the first context information comprises a message authentication code calculated based on at least a portion of the memory address.

Example 17 may include the subject matter of any one of Examples 11-16, wherein the first context information comprises permission bits indicating a level of access authorized for the memory location.

Example 18 may include the subject matter of any one of Examples 11-17, wherein the first context information comprises type bits indicating a class of the encrypted data in the memory location.

Example 19 may include the subject matter of any one of Examples 11-18, wherein the first context information comprises version bits representing a deterministically different value associated with the encoded pointer.

Example 20 may include the subject matter of any one of Examples 11-19, wherein the first context information comprises a lookup tag to index to an entry of a table, wherein the entry comprises second context information.

Example 21 includes one or more computer-readable media with code stored thereon, wherein the code is executable to cause a machine to store, in a register, an encoded pointer to a memory location, wherein the encoded pointer comprises first context information and a slice of a memory address of the memory location, wherein the first context information includes an identification of a data key; decode the encoded pointer to obtain the memory address of the memory location; use the memory address obtained by decoding the encoded pointer to access encrypted data at the memory location; and decrypt the encrypted data based on the data key.

Example 22 may include the subject matter of Example 21, wherein the encoded pointer has a length of at least 128 bits.

Example 23 may include the subject matter of any one of Examples 21-22, wherein the first context information is plaintext within the encoded pointer and the encoded pointer further comprises encrypted second context information.

Example 24 may include the subject matter of Example 23, wherein the encrypted second context information is encrypted in a block of the encoded pointer that further comprises an encrypted portion of the memory address.

Example 25 may include the subject matter of Example 23, wherein the code is executable to cause the machine to decrypt the encrypted data based further on a first tweak, the first tweak including one or more bits derived, at least in part, from the first context information and the second context information.

Example 26 may include the subject matter of any one of Examples 21-25, wherein the first context information comprises a message authentication code calculated based on at least a portion of the memory address.

Example 27 may include the subject matter of any one of Examples 21-26, wherein the first context information comprises permission bits indicating a level of access authorized for the memory location.

Example 28 may include the subject matter of any one of Examples 21-27, wherein the first context information comprises type bits indicating a class of the encrypted data in the memory location.

Example 29 may include the subject matter of any one of Examples 21-28, wherein the first context information comprises version bits representing a deterministically different value associated with the encoded pointer.

Example 30 may include the subject matter of any one of Examples 21-29, wherein the first context information comprises a lookup tag to index to an entry of a table, wherein the entry comprises second context information.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A processor unit, comprising:
a first memory element to store an encoded pointer to a memory location, wherein the encoded pointer comprises first context information and a slice of a memory address of the memory location, wherein the first context information includes an identification of an address key that is a secret key used to encrypt and decrypt slices of encoded pointers; and
circuitry to:
use the address key to cryptographically decode a portion of the encoded pointer during a determination of the memory address of the memory location;
use the determined memory address to access encrypted data at the memory location; and
decrypt the encrypted data based on a data key.

2. The processor unit of claim 1, wherein the encoded pointer has a length of at least 128 bits.

3. The processor unit of claim 1, wherein the first context information is plaintext within the encoded pointer and the encoded pointer further comprises encrypted second context information.

4. The processor unit of claim 3, wherein the encrypted second context information is encrypted in a block of the encoded pointer that further comprises an encrypted portion of the memory address.

5. The processor unit of claim 3, the circuitry to decrypt the encrypted data based further on a first tweak, the first tweak including one or more bits derived, at least in part, from the first context information and the second context information.

6. The processor unit of claim 1, wherein the first context information comprises a message authentication code calculated based on at least a portion of the memory address.

7. The processor unit of claim 1, wherein the first context information comprises permission bits indicating a level of access authorized for the memory location.

8. The processor unit of claim 1, wherein the first context information comprises type bits indicating a class of the encrypted data in the memory location.

9. The processor unit of claim 1, wherein the first context information comprises version bits representing a deterministically different value associated with the encoded pointer.

10. The processor unit of claim 1, wherein the first context information comprises a lookup tag to index to an entry of a table, wherein the entry comprises second context information.

11. A method, comprising:
storing, in a register, an encoded pointer to a memory location, wherein the encoded pointer comprises first context information and a slice of a memory address of the memory location, wherein the first context information includes an identification of an address key that is a secret key used to encrypt and decrypt slices of encoded pointers;
cryptographically decoding a portion of the encoded pointer using the address key in order to obtain the memory address of the memory location;
using the memory address to access encrypted data at the memory location; and
decrypting the encrypted data based on a data key.

12. The method of claim 11, wherein the encoded pointer has a length of at least 128 bits.

13. The method of claim 11, wherein the first context information is plaintext within the encoded pointer and the encoded pointer further comprises encrypted second context information.

14. The method of claim 13, wherein the encrypted second context information is encrypted in a block of the encoded pointer that further comprises an encrypted portion of the memory address.

15. The method of claim 13, further comprising decrypting the encrypted data based further on a first tweak, the first tweak including one or more bits derived, at least in part, from the first context information and the second context information.

16. One or more non-transitory computer-readable media with code stored thereon, wherein the code is executable to cause a machine to:
store, in a register, an encoded pointer to a memory location, wherein the encoded pointer comprises first context information and a slice of a memory address of the memory location, wherein the first context information includes an identification of an address key that is a secret key used to encrypt and decrypt slices of encoded pointers;

use the address key during cryptographic decoding of a portion of the encoded pointer in order to obtain the memory address of the memory location;

use the memory address to access encrypted data at the memory location; and decrypt the encrypted data based on a data key.

17. The one or more computer-readable media of claim 16, wherein the encoded pointer has a length of at least 128 bits.

18. The one or more computer-readable media of claim 16, wherein the first context information is plaintext within the encoded pointer and the encoded pointer further comprises encrypted second context information.

19. The one or more computer-readable media of claim 18, wherein the encrypted second context information is encrypted in a block of the encoded pointer that further comprises an encrypted portion of the memory address.

20. The one or more computer-readable media of claim 18, wherein the code is executable to cause the machine to decrypt the encrypted data based further on a first tweak, the first tweak including one or more bits derived, at least in part, from the first context information and the second context information.

* * * * *